(12) United States Patent
Shariff et al.

(10) Patent No.: US 11,294,401 B2
(45) Date of Patent: Apr. 5, 2022

(54) FLOW MANAGEMENT SYSTEMS AND RELATED METHODS FOR OIL AND GAS APPLICATIONS

(71) Applicant: Saudi Arabian Oil Company, Dhahran (SA)

(72) Inventors: Maher Maqbool Shariff, Dhahran (SA); Taras Yurievich Makogon, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 156 days.

(21) Appl. No.: 16/923,602

(22) Filed: Jul. 8, 2020

(65) Prior Publication Data

US 2022/0011789 A1 Jan. 13, 2022

(51) Int. Cl.
 *G05D 7/06* (2006.01)
 *E21B 41/00* (2006.01)
 *F16L 55/00* (2006.01)

(52) U.S. Cl.
 CPC ....... *G05D 7/0629* (2013.01); *E21B 41/0007* (2013.01); *F16L 55/00* (2013.01)

(58) Field of Classification Search
 CPC ...... E21B 31/00; E21B 41/0007; F16L 55/00; G05D 7/0629; F17D 3/01
 See application file for complete search history.

(56) References Cited

U.S. PATENT DOCUMENTS

| | | | |
|---|---|---|---|
| 362,368 A | 5/1887 | Dikeman | |
| 1,384,305 A | 7/1921 | Meador | |
| 2,221,775 A | 11/1940 | Boynton | |
| 2,390,093 A | 12/1945 | Ed | |
| 2,828,823 A | 4/1958 | Mounce | |
| 2,969,841 A | 1/1961 | Thomas | |
| 3,623,684 A | 11/1971 | Kline | |
| 4,596,586 A | 6/1986 | Davies et al. | |
| 5,271,469 A | 12/1993 | Brooks | |
| 5,375,662 A | 12/1994 | Echols, III et al. | |
| 5,619,611 A | 4/1997 | Loschen et al. | |

(Continued)

FOREIGN PATENT DOCUMENTS

| | | |
|---|---|---|
| AU | 2009202232 | 10/2013 |
| CA | 1304286 | 6/1992 |

(Continued)

OTHER PUBLICATIONS

Machine translation of KR20150000297A (Year: 2015).*

(Continued)

*Primary Examiner* — Michael R Reid
(74) *Attorney, Agent, or Firm* — Fish & Richardson P.C.

(57) ABSTRACT

A method of managing a fluid flow within a conduit includes determining a presence of a flow blockage within the conduit, the conduit being equipped with an expandable device, controlling a fluidic actuator to deliver an actuation fluid to the expandable device to expand the expandable device radially, compacting the flow blockage radially along a length of the expandable device to create a channel adjacent the flow blockage, controlling the fluidic actuator to withdraw actuation fluid from the expandable device to collapse the expandable device radially, and exposing the channel to open the conduit to fluid flow.

20 Claims, 10 Drawing Sheets

(56) References Cited

U.S. PATENT DOCUMENTS

| | | |
|---|---|---|
| 5,981,447 A | 11/1999 | Chang et al. |
| 6,073,692 A | 6/2000 | Wood |
| 6,093,869 A | 7/2000 | Roe et al. |
| 6,307,191 B1 | 10/2001 | Waycuilis |
| 6,343,652 B1 | 2/2002 | Corre et al. |
| 6,691,786 B2 | 2/2004 | Patel |
| 6,695,054 B2 | 2/2004 | Johnson et al. |
| 6,843,832 B2 | 1/2005 | Greene et al. |
| 6,854,522 B2 | 2/2005 | Brezinski et al. |
| 6,939,082 B1 | 9/2005 | Baugh |
| 7,107,706 B1 | 9/2006 | Bailey et al. |
| 7,279,052 B2 | 10/2007 | Kinnari et al. |
| 8,003,573 B2 | 8/2011 | Ballard et al. |
| 8,337,603 B2 | 12/2012 | Akhras et al. |
| 8,425,549 B2 | 4/2013 | Lenker et al. |
| 8,584,687 B1 | 11/2013 | Chen |
| 8,678,039 B2 | 3/2014 | Janssen et al. |
| 8,869,880 B2 | 10/2014 | McClanahan et al. |
| 9,157,290 B2 | 10/2015 | Habesland et al. |
| 9,759,025 B2 | 9/2017 | Vavik |
| 9,828,847 B2 | 11/2017 | Vavik |
| 9,833,727 B1 | 12/2017 | Ball, IV |
| 10,494,894 B2 | 12/2019 | Al-Gouhi et al. |
| 11,149,510 B1 | 10/2021 | Al-Abdulrahman |
| 2001/0022241 A1 | 9/2001 | Portman |
| 2002/0125008 A1 | 9/2002 | Wetzel |
| 2003/0131988 A1 | 7/2003 | Wilson |
| 2003/0196795 A1 | 10/2003 | Kutac |
| 2005/0205261 A1 | 9/2005 | Andersen et al. |
| 2007/0277967 A1 | 12/2007 | Oserod |
| 2009/0205675 A1 | 8/2009 | Sarkar |
| 2010/0236785 A1 | 9/2010 | Collis et al. |
| 2013/0008471 A1 | 1/2013 | Borkowski |
| 2013/0048295 A1 | 2/2013 | Beynet et al. |
| 2014/0124269 A1 | 5/2014 | Logan |
| 2015/0362118 A1 | 12/2015 | Emerson |
| 2018/0065753 A1 | 3/2018 | Schwichtenberg et al. |
| 2018/0192476 A1 | 7/2018 | Chaudhry et al. |
| 2019/0145582 A1 | 5/2019 | Hesketh-Prichard et al. |
| 2020/0056444 A1 | 2/2020 | Benzie |
| 2020/0080386 A1 | 3/2020 | Yang et al. |
| 2020/0206374 A1 | 7/2020 | Cordoba |
| 2021/0332654 A1 | 10/2021 | Patterson |
| 2022/0011791 A1 | 1/2022 | Shariff et al. |

FOREIGN PATENT DOCUMENTS

| | | |
|---|---|---|
| EP | 3450758 | 3/2019 |
| JP | 5143324 | 2/2013 |
| KR | 850001746 | 12/1985 |
| KR | 950003920 | 4/1995 |
| KR | 0132212 | 4/1998 |
| KR | 20150000297 | 1/2015 |
| WO | WO 2010139943 | 12/2010 |
| WO | WO 2016059446 | 4/2016 |
| WO | WO 2021119113 | 6/2021 |

OTHER PUBLICATIONS

Trofaier et al., "Optimizing Separation Efficiency Of Produced Water Tanks By Installing CFD Designed Internals," SPE-174937-MS, Presented at the SPE Annual Technical Conference and Exhibition, Houston, TX, Sep. 28-30, 2015; Society of Petroleum Engineers, 2015, 11 pages.

PCT International Search Report and Written Opinion in International Appln. No. PCT/US2021/040817, dated Oct. 1, 2021, 12 pages.

PCT International Search Report and Written Opinion in International Appln. No. PCT/US2021/040818, dated Oct. 18, 2021, 13 pages.

* cited by examiner

FLOW MANAGEMENT SYSTEMS AND RELATED METHODS FOR OIL AND GAS APPLICATIONS

TECHNICAL FIELD

This disclosure relates to flow management systems utilizing fluidic actuation, as well as related methods of managing fluid flows within production conduits.

BACKGROUND

Production pipelines carrying oil and gas can extend for thousands of kilometers between reservoirs and oil and gas terminals. In some cases, a fluid flow of oil and gas may become partially or completely blocked at certain locations along a production pipeline due to sedimentation of various substances along the pipeline, such as gas hydrates and scale. Accumulation of these substances sometimes results from the combination of a relatively high fluid pressure and a relatively low temperature inside of the pipeline and tends to occur in low-lying sections of the pipeline. Accumulation of the substances may occur over a period of minutes to days and may completely block the fluid flow if left unmitigated. Blockage of the fluid flow can result in costly, delayed arrival of the fluid flow to a final destination.

SUMMARY

This disclosure relates to flow management systems designed to mitigate a pliable blockage within a metallic or non-metallic oil and gas production conduit. An example flow management system includes an expandable device that is attachable to a wall of a conduit for compacting a blockage within the conduit to reopen the conduit to fluid flow. The expandable device includes an inflatable membrane that is fluidically adjustable between an expanded, inflated configuration and a collapsed, deflated configuration using an actuation fluid. Accordingly, the flow management system also includes a fluidic actuator for delivering actuation fluid to or withdrawing actuation fluid from the expandable device, an actuation line extending between the fluidic actuator and the expandable device, one or more sensors for detecting various parameters of the fluid flow within the conduit, valves for managing a flow of the actuation fluid through the actuation line, and a control module for controlling operation of the fluidic actuator and various other associated components of the flow management system. Depending on certain aspects of the conduit, the expandable device may be attached to an interior wall surface of the conduit or to an exterior wall surface of the conduit.

In one aspect, a flow management system includes an expandable device that is configured for attachment to a wall surface of a conduit and that is adjustable between an expanded configuration and a collapsed configuration. The flow management system further includes a fluidic actuator in fluid communication with the expandable device and a control module. The control module is configured to control the fluidic actuator to deliver actuation fluid to the expandable device to expand the expandable device for compacting a flow blockage within the conduit to create a channel adjacent the flow blockage and to withdraw actuation fluid from the expandable device to collapse the expandable device for opening the channel to a fluid flow within the conduit.

Embodiments may provide one or more of the following features.

In some embodiments, the expandable device includes an inflatable membrane configured to inflate upon receiving actuation fluid and configured to deflate upon removal of actuation fluid.

In some embodiments, the expandable device further includes multiple protective plates that surround and are attached to the inflatable membrane.

In some embodiments, the multiple protective plates are configured to protect the inflatable membrane from erosion.

In some embodiments, the expandable device has an elongate shape.

In some embodiments, the expandable device is configured to expand radially to compact the flow blockage and to collapse radially to expose the channel.

In some embodiments, the fluidic actuator is configured to actuate the expandable device pneumatically.

In some embodiments, the fluidic actuator includes an air compressor.

In some embodiments, the fluidic actuator is configured to actuate the expandable device hydraulically.

In some embodiments, the fluidic actuator includes a pump.

In some embodiments, the flow management system further includes an actuation line that extends between the fluidic actuator and the expandable device and a valve that manages flow of the actuation fluid through the actuation line.

In some embodiments, the actuation line branches into opposite directions at the expandable device to service opposite sides of the expandable device.

In some embodiments, the flow management system further includes a temperature sensor and a pressure sensor for respectively detecting a temperature and a pressure within the conduit.

In some embodiments, the controller is operable to control the fluidic actuator based on data acquired by one or both of the temperature and pressure sensors.

In some embodiments, the flow management system further includes a flow rate sensor for determining a flow rate of fluid flowing within the conduit.

In some embodiments, the controller is operable to control the fluidic actuator based on data acquired by the flow rate sensor.

In some embodiments, the flow management system further includes multiple straps for securing the expandable device to the conduit.

In some embodiments, each strap of the multiple straps is adjustable in diameter.

In some embodiments, the multiple straps are distributed along an entire length of the expandable device.

In some embodiments, the flow management system further includes a protective cover arranged along an outer side of the expandable device.

In another aspect, a method of managing a fluid flow within a conduit includes determining a presence of a flow blockage within the conduit, the conduit being equipped with an expandable device, controlling a fluidic actuator to deliver an actuation fluid to the expandable device to expand the expandable device radially, compacting the flow blockage radially along a length of the expandable device to create a channel adjacent the flow blockage, controlling the fluidic actuator to withdraw actuation fluid from the expandable device to collapse the expandable device radially, and exposing the channel to open the conduit to fluid flow.

Embodiments may provide one or more of the following features.

In some embodiments, the expandable device includes an inflatable membrane, and the method further includes delivering actuation fluid to the inflatable membrane to inflate the inflatable membrane and withdrawing actuation fluid from the inflatable membrane to deflate the inflatable membrane.

In some embodiments, the expandable device further includes multiple protective plates that surround and are attached to the inflatable membrane.

In some embodiments, the multiple protective plates are configured to protect the inflatable membrane from erosion.

In some embodiments, the method further includes aligning the expandable device with an elongate axis of the conduit.

In some embodiments, compacting the flow blockage includes providing direct contact between the expandable device and the flow blockage.

In some embodiments, compacting the flow blockage includes deforming the conduit radially inward.

In some embodiments, the method further includes pneumatically actuating the expandable device.

In some embodiments, the method further includes hydraulically actuating the expandable device.

In some embodiments, the method further includes flowing the actuation fluid through an actuation line that extends between the fluidic actuator and the expandable device.

In some embodiments, the method further includes controlling a valve that manages flow of the actuation fluid through the actuation line.

In some embodiments, the method further includes delivering the actuation fluid to opposite sides of the expandable device.

In some embodiments, the method further includes detecting a temperature and a pressure within the conduit respectively at a temperature sensor and at a pressure sensor disposed within the conduit.

In some embodiments, the method further includes determining a flow rate of fluid flowing through the conduit at a flow rate sensor.

In some embodiments, the method further includes controlling the fluidic actuator based on data acquired by the flow rate sensor.

In some embodiments, the method further includes securing the expandable device to the conduit with multiple straps.

In some embodiments, the method further includes adjusting each strap of the multiple straps based on a local diameter of the conduit.

In some embodiments, the method further includes distributing the multiple straps along an entire length of the expandable device.

In some embodiments, the method further includes installing a protective cover along an outer side of the expandable device.

In some embodiments, the method further includes installing the expandable device to an exterior surface of the conduit.

The details of one or more embodiments are set forth in the accompanying drawings and description. Other features, aspects, and advantages of the embodiments will become apparent from the description, drawings, and claims.

DETAILED DESCRIPTION

Figure 1:
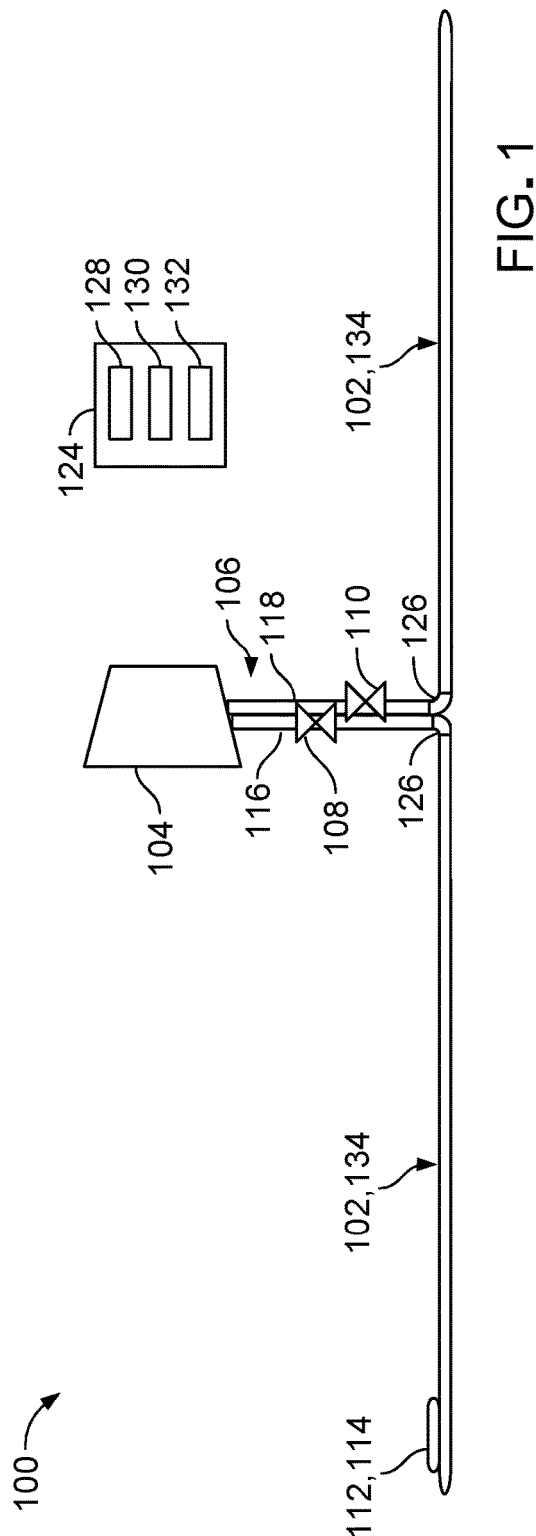
FIG. 1 is a side perspective view of a flow management system.
Figure 2:
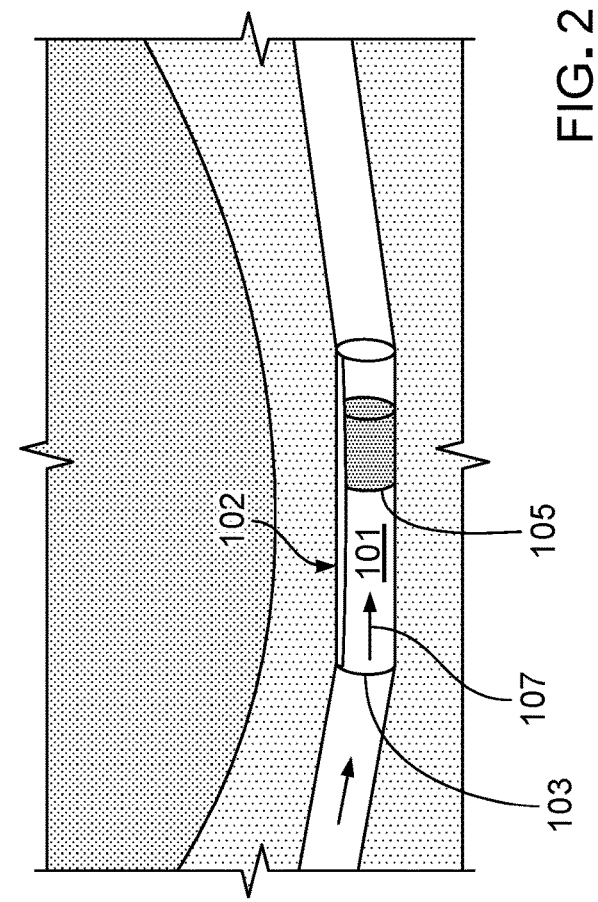
FIG. 2 is a side perspective view of a deployed conduit, obstructed with a flow blockage and equipped with a linear expandable device of the flow management system of FIG. 1 in a collapsed configuration and positioned along an interior surface of the conduit.
Figure 3:
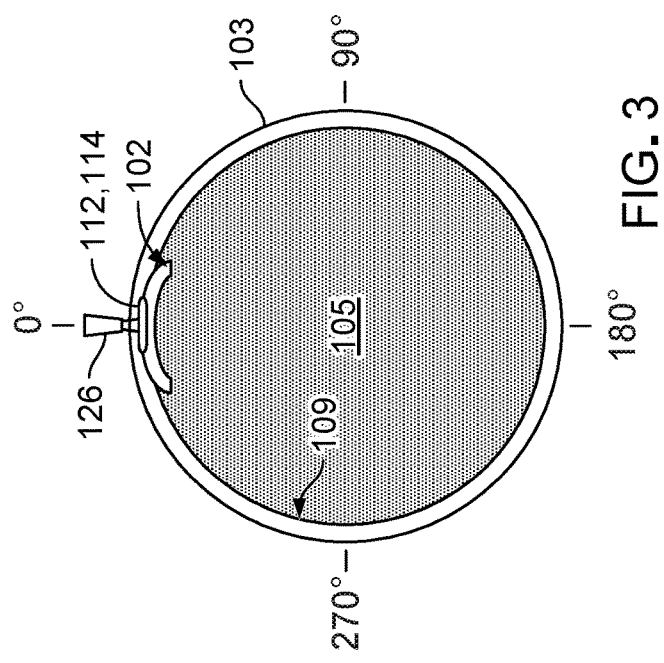
FIG. 3 is a cross-sectional view of the conduit of FIG. 2, obstructed with the flow blockage and equipped with the expandable device of FIG. 2 in the collapsed configuration.

Referring to FIGS. 1-3, a flow management system 100 is designed to reopen a flow channel 101 of a conduit 103 to fluid flow amidst an accumulation of substances that form a blockage 105 within the conduit 103. In some examples, the blockage 105 may be a compliant obstruction formed from one or more substances, such as a gas hydrate, an oil hydrate, sand, scale, corrosion layers, or several other solid sediments that may accumulate in oil and gas conduits. In the example of FIG. 2, the conduit 103 is a rigid pipe segment formed of steel or a non-metallic plastic or is a flexible pipe segment (for example, a flexible transfer hose) formed of composite materials. The conduit 103 carries a flow of fluid 107 that includes one or both of oil and gas. In some embodiments, the conduit 103 is a segment of a subsea production pipeline, as shown in FIG. 2. In other embodiments, the conduit 103 is a segment of an onshore production pipeline.

Referring particularly to FIG. 1, the flow management system 100 includes an expandable device 102 (for example, an adjustable compactor) for compacting the blockage 105 to reopen the flow channel 101 to fluid flow, a fluidic actuator 104 for activating and deactivating the expandable device 102, a dual-channel actuation line 106 extending between the fluidic actuator 104 and the expandable device 102, valves 108, 110 (for example, solenoid valves) positioned on the actuation line 106, and optional temperature and pressure sensors 112, 114 positioned on the expandable device 102 for respectively detecting a temperature and a pressure of the fluid 107. The flow management system 100 further includes a control module 124 located at the surface for controlling operation of the fluidic actuator 104 and various components of the flow management system 100. The control module 124 includes hardware 128, one or more processors 130 implemented on the hardware 128, and a user interface 132.

The expandable device 102 has a thin profile with a generally linear configuration including two portions 134 that together extend along a length of the conduit 103 in two opposite directions from a single access point defined by two adjacent fluidic ports 126. In the example of FIG. 2, the expandable device 102 is preinstalled to an inner surface 109 of the conduit 103. For example, the expandable device 102 is installed at an axial location along the conduit 103 that is predicted to be vulnerable to blockage by multiphase flow assurance hydraulic analyses. Such locations are often at low-lying positions where the effect of gravity tends to promote accumulation of substances or at positions that experience low fluid velocity such that low fluid flow shear would tend to result in an accumulation of substances along the conduit 103. Advantageously, interior placement of the expandable device 102 along the inner surface 109 does not interfere with pipeline maintenance when performing scraping or utilizing intelligent inspection devices, such as magnetic flux leakage (MFL) devices.

The expandable device 102 may generally be installed in a pipe of any configuration (for example, horizontal or vertical) and any shape (for example, straight, conical, or another shape). In some examples, as shown in FIG. 3, the expandable device 102 is installed at a circumferential position between about 315 degrees (for example, −45 degrees) and about 45 degrees with respect to a reference position of 0 degrees (for example, a twelve o'clock position) or more particularly at a circumferential position between about 350 degrees (for example, −10 degrees) and about 10 degrees with respect to the reference position. Installation of the adjustable compactor 102 within such ranges in proximity to the top, twelve o'clock circumferential position takes advantage of the effect of gravity, which promotes settling of any blockage debris away from the adjustable compactor 102 once the blockage 105 has been compacted. In other examples, the expandable device 102 may be installed at any circumferential position between 0 degrees and 360 degrees around a circumference of the conduit 103.

Figure 5:
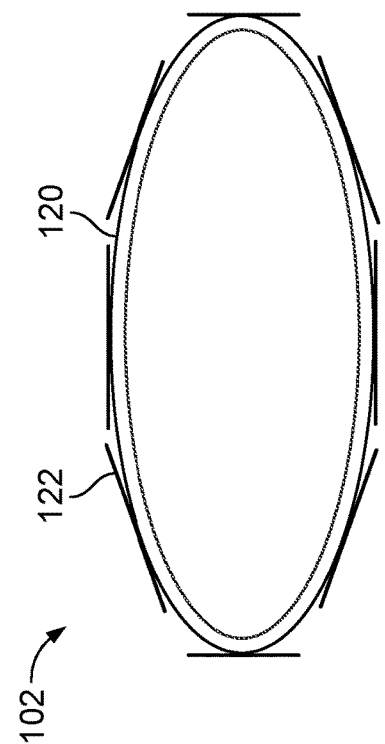
FIG. 5 is an enlarged cross-sectional view of the expandable device of FIG. 1 in an expanded configuration.
Figure 4:
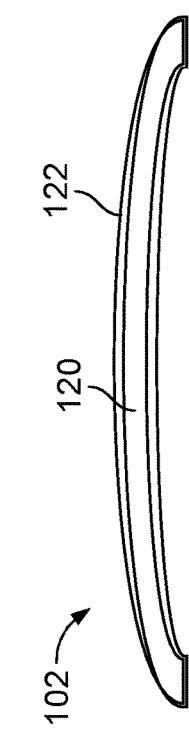
FIG. 4 is an enlarged cross-sectional view of the expandable device of FIG. 1 in the collapsed configuration.

Referring to FIGS. 4 and 5, each portion 134 of the expandable device 102 includes an inflatable membrane 120 and multiple protective plates 122 that are attached to the inflatable membrane 120. The protective plates 122 typically extend axially along a full length of the inflatable membrane 120. The expandable device 102 can be fluidically activated (for example, filled with an actuation fluid) to expand (for example, inflate) the inflatable membrane 120 and fluidically deactivated (for example, relieved of the actuation fluid) to collapse (for example, deflate) the inflatable membrane 120. The inflatable membrane 120 has a generally arcuate cross-sectional shape in a collapsed configuration and a generally ovular cross-sectional shape in an expanded configuration. In the collapsed configuration, the protective plates 122 contact each other to substantially surround an entire surface of the inflatable membrane 120 to protect the inflatable membrane 120 from erosion by droplets and solids and from ripping from a scraper and an MFL tool, whereas in the expanded configuration, the protective plates 122 define small gaps 124 that expose small regions of the surface of the inflatable membrane 120. Since the conduit 103 is typically blocked to fluid flow when the inflatable membrane 120 is expanded, the gaps 124 do not expose the inflatable membrane to the corrosive fluid 107.

The expandable device 102 typically has a length that falls in a range of about 5 meters (m) to about 100 m, a fully expanded width that falls in a range of about 0.01 m to about 0.05 m, and a fully expanded height that typically falls in a range of about 0.01 m to about 0.05 m. The inflatable membrane 120 typically has a fluid volume capacity that falls in a range of about 4 liters (L)/100 m to about 64 L/100 m. The inflatable membrane 120 is typically made of one or more corrosion-resistant, compliant materials that can mechanically withstand multiple actuation cycles and temperature and pressure spikes and that can chemically withstand the corrosive environment of the flow channel 101. In some embodiments, the inflatable membrane 120 may be made of one or more materials including polymers and other materials. The protective plates 122 may be made of one or more corrosion-resistant materials, such as ceramic or steel.

The actuation line 106 may be located anywhere along a length of the expandable device 102, such as along a central portion, as shown in FIG. 1. The actuation line 106 includes two fluid channels 116, 118 that branch in opposite directions at the respective fluidic ports 126 to service opposite sides of the expandable device 102. The fluid channels 116, 118 are respectively equipped with the valves 108, 110. The actuation line 106 is typically provided as flexible coiled tubing that is made of steel or composite materials. In some embodiments, the actuation line 106 may extend a length between the fluidic actuator 104 and the expandable device 102 of up to about 3,000 m, or more particularly a length in a range of about 1 m to about 90 m, in some embodiments.

In some examples, the actuation fluid for operating the expandable device 102 may be a gas, such as air or nitrogen. Accordingly, the fluidic actuator 104 may be provided as an air compressor that pneumatically operates the expandable device 102 by delivering air to or withdrawing air from the expandable device 102 through the actuation line 106. The air compressor may be located at the surface or located subsea and include an air intake buoy at the surface. In other examples, the actuation fluid may be a liquid, such as sea water. Accordingly, the fluidic actuator 104 may alternatively be provided as a pump that hydraulically operates the expandable device 102 by delivering liquid to or withdrawing liquid from the expandable device 102 via the actuation line 106. The pump may be located at the surface (for example, at a service vehicle, a vessel, or a pipe with power supplied by an electric cable or by an artificial intelligence-controlled inspection autonomous underwater vehicle through electro inductive coupling).

Referring to FIG. 3, the sensors 112, 114 are positioned between the expandable device 102 and the conduit 103. In some embodiments, the sensors 112, 114 are in wireless communication with the control module 124. In other embodiments, the sensors 112, 114 are in wired communication with the control module 124 via a signal cable that is routed along the actuation line 106.

Figure 7:
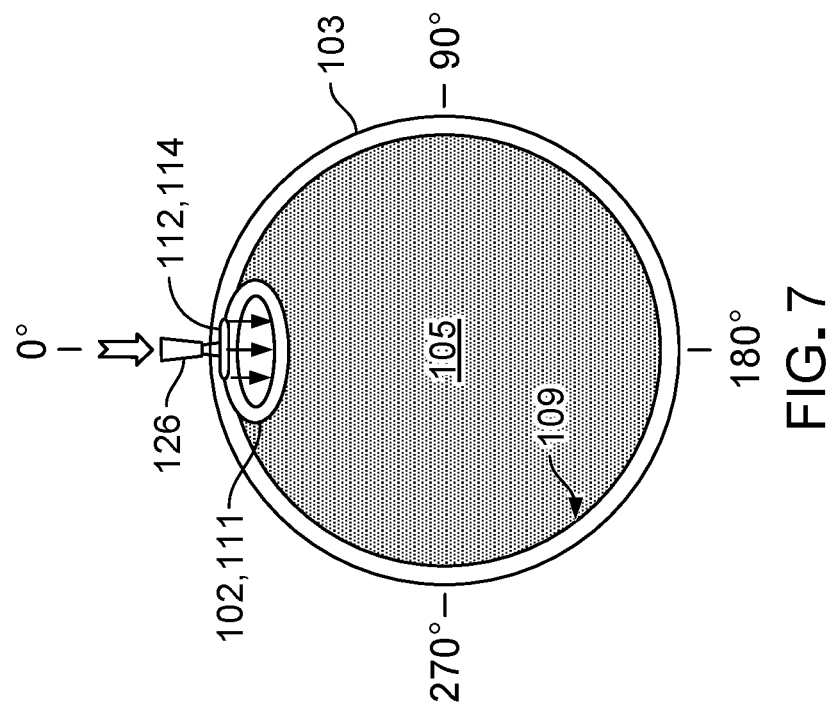
FIG. 7 is a cross-sectional view of the conduit of FIG. 2, obstructed with the flow blockage and equipped with the expandable device of FIG. 1 in the expanded configuration.
Figure 6:
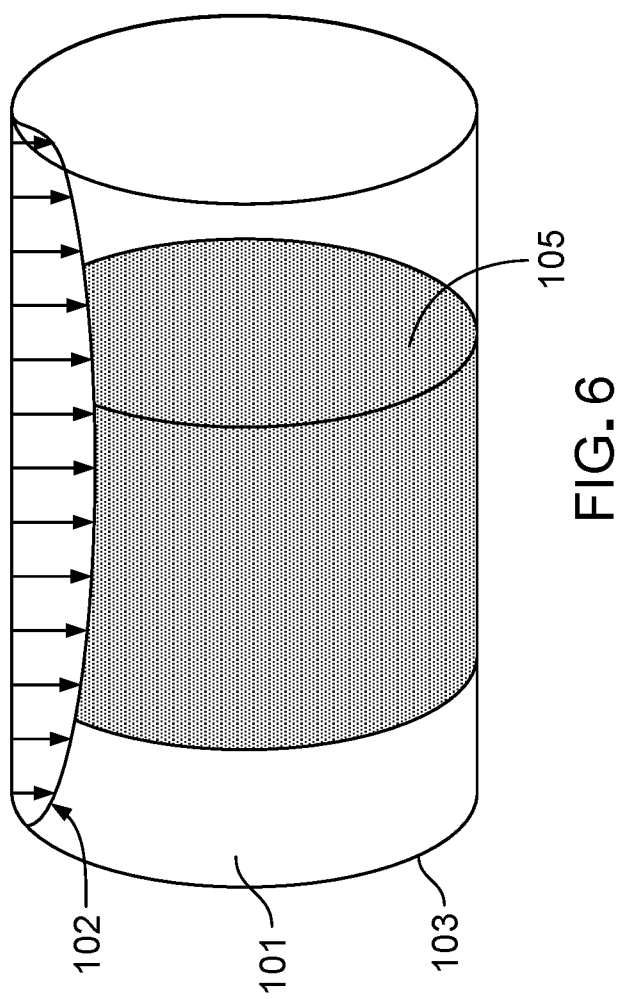
FIG. 6 is a side perspective view of the conduit of FIG. 2, obstructed with the flow blockage and equipped with the expandable device of FIG. 1 in the expanded configuration.

Referring to FIGS. 6 and 7, the control module 124 controls the fluidic actuator 104 to deliver actuation fluid to the inflatable membrane 120 to inflate the inflatable membrane 120 to an expanded configuration based at least in part on measurements detected by the sensors 112, 114. During expansion, the inflatable membrane 120 exerts a radial force to directly compact the blockage 105 in the conduit 103. Such compaction shatters the blockage 105 (for example, turning the blockage 105 into particles of debris) and accordingly creates an axial channel 111 within or adjacent the blockage 105. In a case of pneumatic actuation, the inflatable membrane 120 is typically fully inflated to maximize compaction of the blockage 105. In other examples, such as in a case of hydraulic actuation, the inflatable membrane 120 may be inflated completely or inflated only partially to a variable extent that depends on conditions within the conduit 103.

Figure 9:
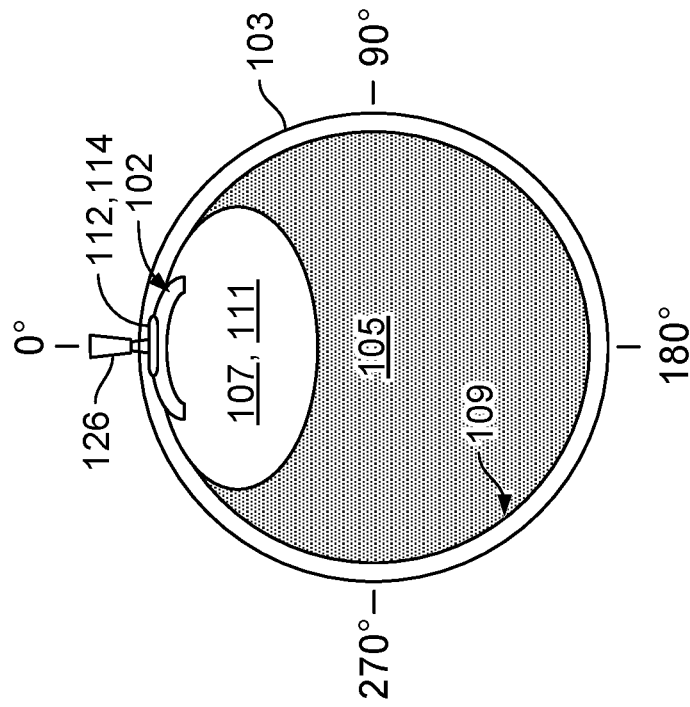
FIG. 9 is a cross-sectional view of the conduit of FIG. 2, partially, but less obstructed with the flow blockage and equipped with the expandable device of FIG. 1 in the collapsed configuration.
Figure 8:
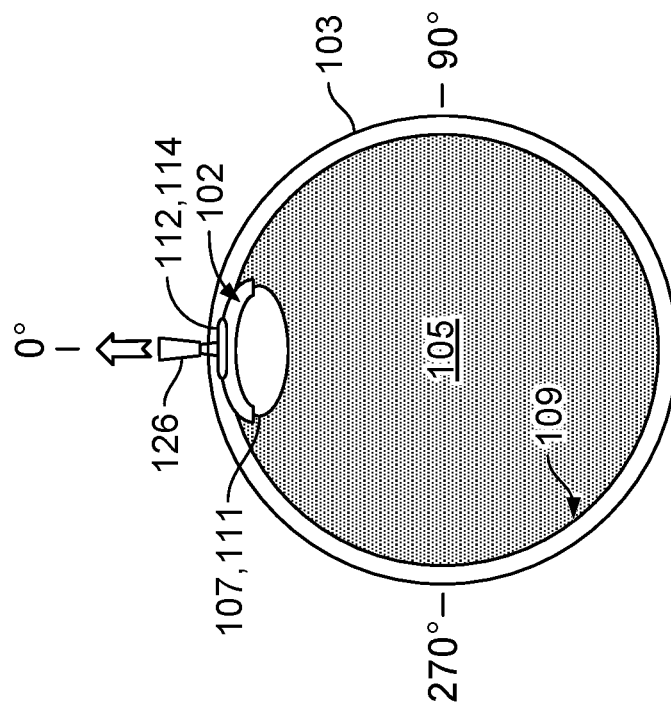
FIG. 8 is a cross-sectional view of the conduit of FIG. 2, partially obstructed with the flow blockage and equipped with the expandable device of FIG. 1 in the collapsed configuration.
Figure 10:
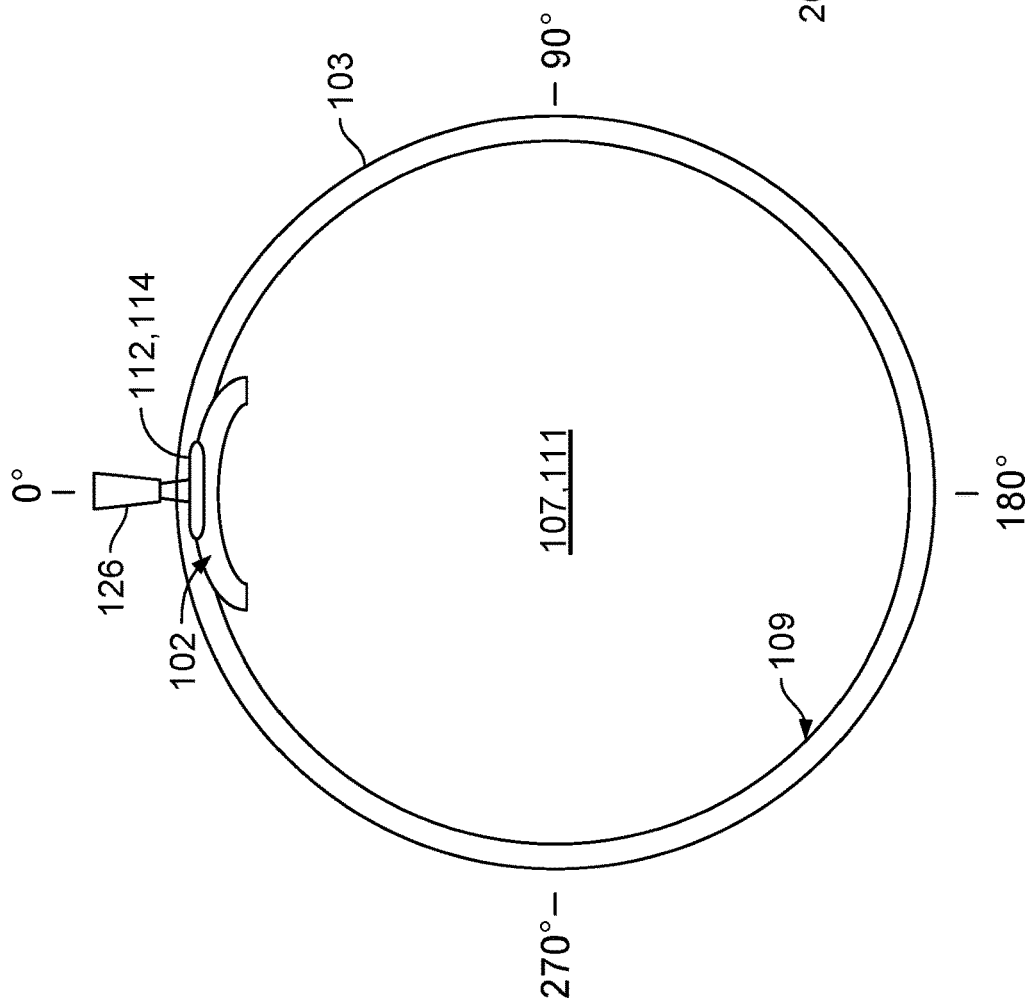
FIG. 10 is a cross-sectional view of the conduit of FIG. 2 in a state fully open to fluid flow and equipped with the expandable device of FIG. 1 in the collapsed configuration.

Referring to FIG. 8, the control module 124 further controls the fluidic actuator 104 to withdraw actuation fluid from the inflatable membrane 120 to return the inflatable membrane 120 to the collapsed configuration, thereby opening the channel 111 to flow of the fluid 107 and accordingly resulting in depressurization of the fluid 107. With flow of the fluid 107 reestablished in the conduit 103, additional blockage remediation efforts can be carried out, such as circulating a solvent through the conduit 103 or deploying a heating means (for example, one or more of a chemical, electrical, and mechanical heating means) to the conduit 103. Referring to FIGS. 9 and 10, flow of the fluid 107 gradually washes out the blockage 105 and enlarges the channel 111 until the conduit 103 has been substantially cleared of the blockage 105 to permit free, unobstructed flow of the fluid 107.

During a production operation, an operator may observe a change in the flow rate of the fluid 107 or a change in a fluid pressure drop across the conduit 103. If the operator determines that such changes are due to a blockage 105, then the operator inputs an instruction at the user interface 132 to activate (for example, energize) the fluidic actuator 104. The control module 124 controls the fluidic actuator 104 and the valves 108, 110 on the actuation line 106 to supply actuation fluid to the inflatable membrane 120. The inflatable membrane 120 accordingly expands and compacts the blockage 105 to create a channel 111 within or adjacent the blockage 105.

The control module 124 subsequently deactivates (for example, de-energizes) the fluidic actuator 104 and controls the valves 108, 110 to pull actuation fluid from the inflatable membrane 120 to return the inflatable membrane 120 to the collapsed configuration. Deflation of the inflatable membrane 120 opens the channel 111 to fluid flow. Additional blockage remediation efforts are deployed to the channel 111, and normal production is resumed at the conduit 103. In some examples, actuation of the expandable device 102 to destruct even partial blockages 105 in a vicinity of the expandable device 102 can prevent or otherwise mitigate potential clogging of the conduit 103. Utilization of the flow management system 100 advantageously prevents the need to remediate blockages using conventional devices, such as electrically or hydraulically actuated depressurization pumps, which can cost in the tens of millions of dollars. Accordingly, the flow management system 100 provides a cost-effective solution for mitigating blockages in production pipelines in onshore, subsea, and arctic environments.

In some embodiments, the control module 124 automatically controls the fluidic actuator 104 and the valves 108, 110 to supply actuation fluid to the inflatable membrane 120 without input from an operator, such as when a temperature inside of the conduit 103 approaches a freezing temperature, as determined by the sensors 112, 114. In some embodiments, the control module 124 is additionally programmed to operate in conjunction with online advisory tools or machine learning flow assurance tools (such as a pipeline optimization monitoring advisory solution) that can predict when a blockage is likely to occur and when to actuate the expandable device 102.

Figure 11:
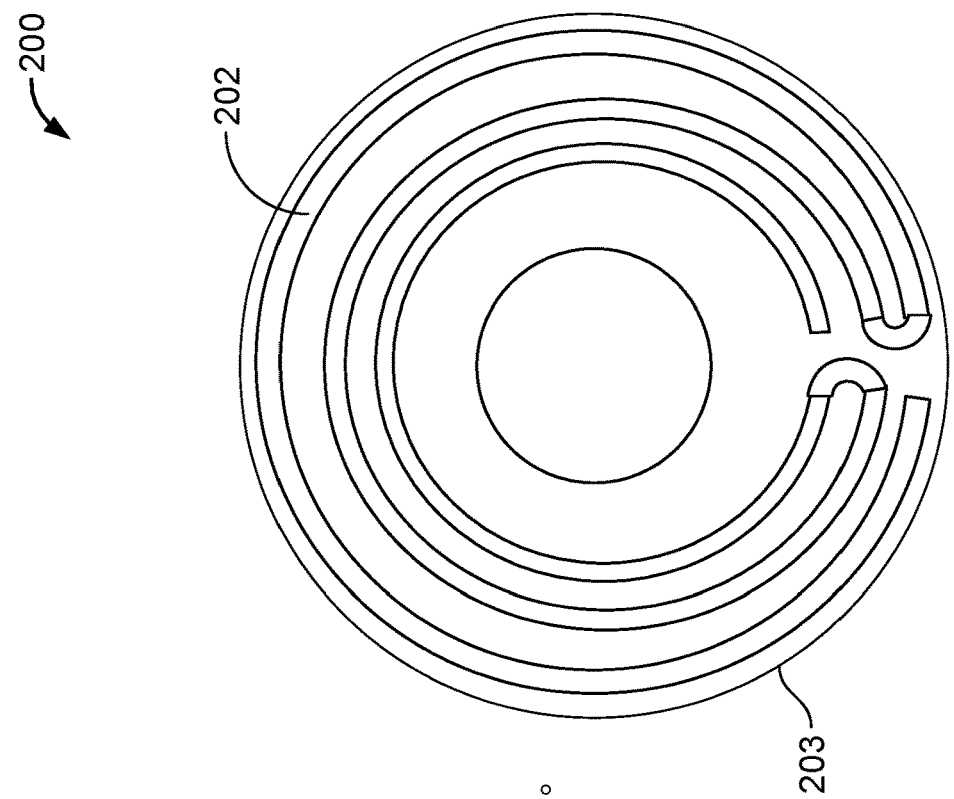
FIG. 11 is a cross-sectional view of a conduit equipped with a circumferential expandable device of a flow management system.

While the flow management system 100 has been described and illustrated with respect to certain dimensions, sizes, shapes, arrangements, materials, and methods, in some embodiments, a flow management system that is otherwise substantially similar in construction and function to the flow management system 100 may include one or more different dimensions, sizes, shapes, arrangements, configurations, and materials or may be utilized according to different methods. For example, while the flow management system 100 has been described and illustrated as including an expandable device 102 that extends around only a fraction of the circumference of the conduit 103, in some embodiments, a flow management system may include an expandable device that has a wavy, sinusoidal, or otherwise spiral configuration that extends around an entire circumference of a conduit. FIG. 11 illustrates a perspective view of such an expandable device 202 of a flow management system 200 installed within a conduit 203. The flow management system 200 is otherwise substantially similar in construction and function to the flow management system 100 and accordingly includes the fluidic actuator 104, the actuation line 106, the valves 108, 110, optionally the sensors 112, 114, and the control module 124, and may be used in the manner described above with respect to use of the flow management system 100. Extending around the entire circumference of the conduit 203, the expandable device 202 is operable to squeeze a blockage to compact and destruct the blockage.

Figure 12:
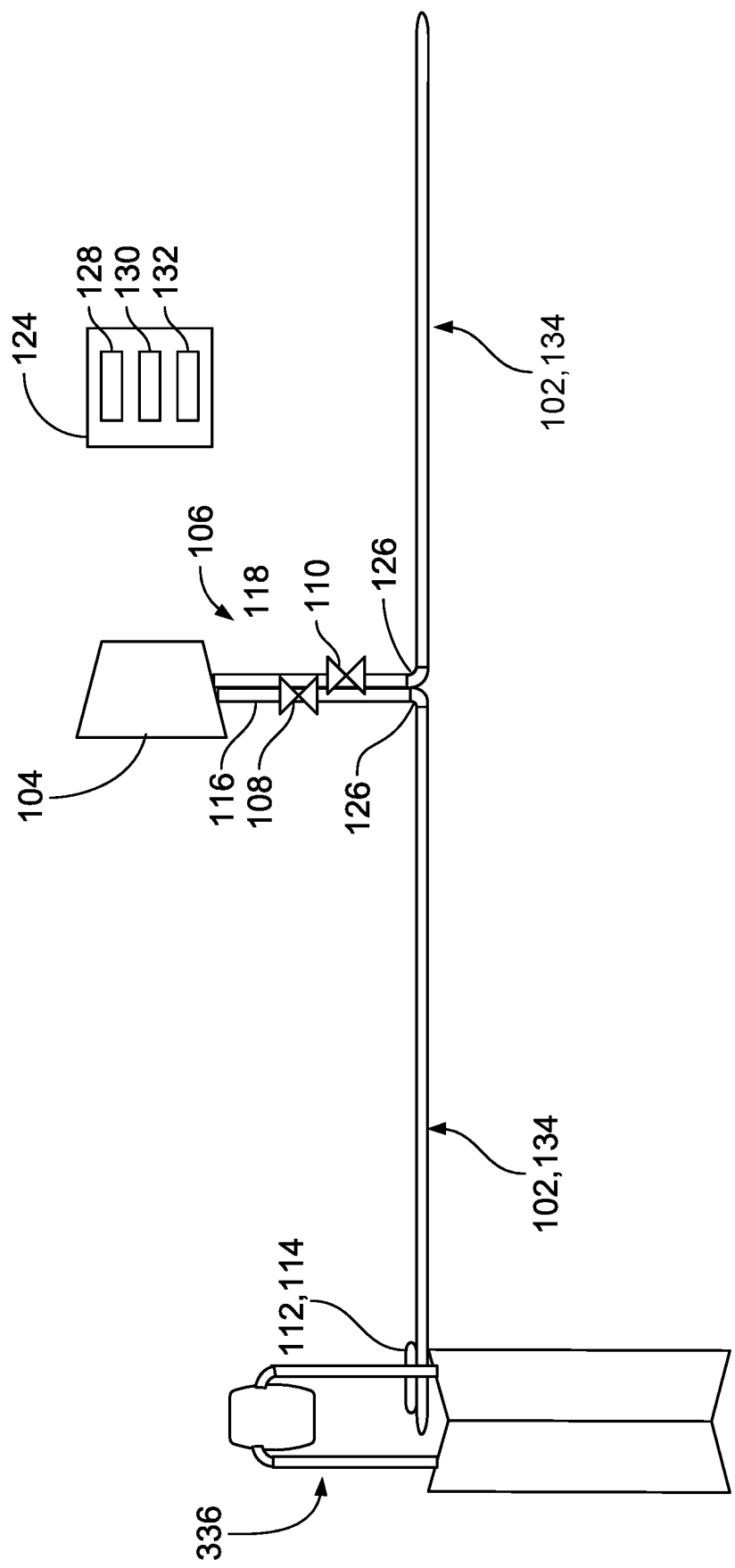
FIG. 12 is a side perspective view of a flow management system that includes a flow rate sensor.

In some embodiments, a flow management system 300 may additionally or alternatively include a flow sensor 336, as shown in FIG. 12. The flow sensor 336 may be located at an outlet end of a conduit such that an upstream blockage would result in a reduced or zero flow rate detected at the flow sensor 336. The flow management system 300 is otherwise substantially similar in construction and function to the flow management system 100 and accordingly includes the expandable device 102, the fluidic actuator 104, the actuation line 106, the valves 108, 110, optionally the sensors 112, 114, and the control module 124. The flow sensor 336 is a differential pressure (for example, diaphragm-type) flow sensor that measures actual flow rates or predicts expected flow rates of a fluid and communicates the flow rates to the control module 124. Such data allows the control module 124 to control actuation of the expandable device 102 automatically without input from an operator concerning a flow behavior of the fluid. For example, if a change in the flow rate of the fluid or a change in a fluid pressure drop across the conduit is detected by the flow sensor 336, then the control module 124 can actuate the expandable device 102 to compact a blockage, as discussed above with respect to the flow management system 100. Accurate determination of the temperature of the fluid may be particularly important when operating the flow management system 300 with the flow sensor 336, as the temperature can change significantly, seasonally.

Figure 13:
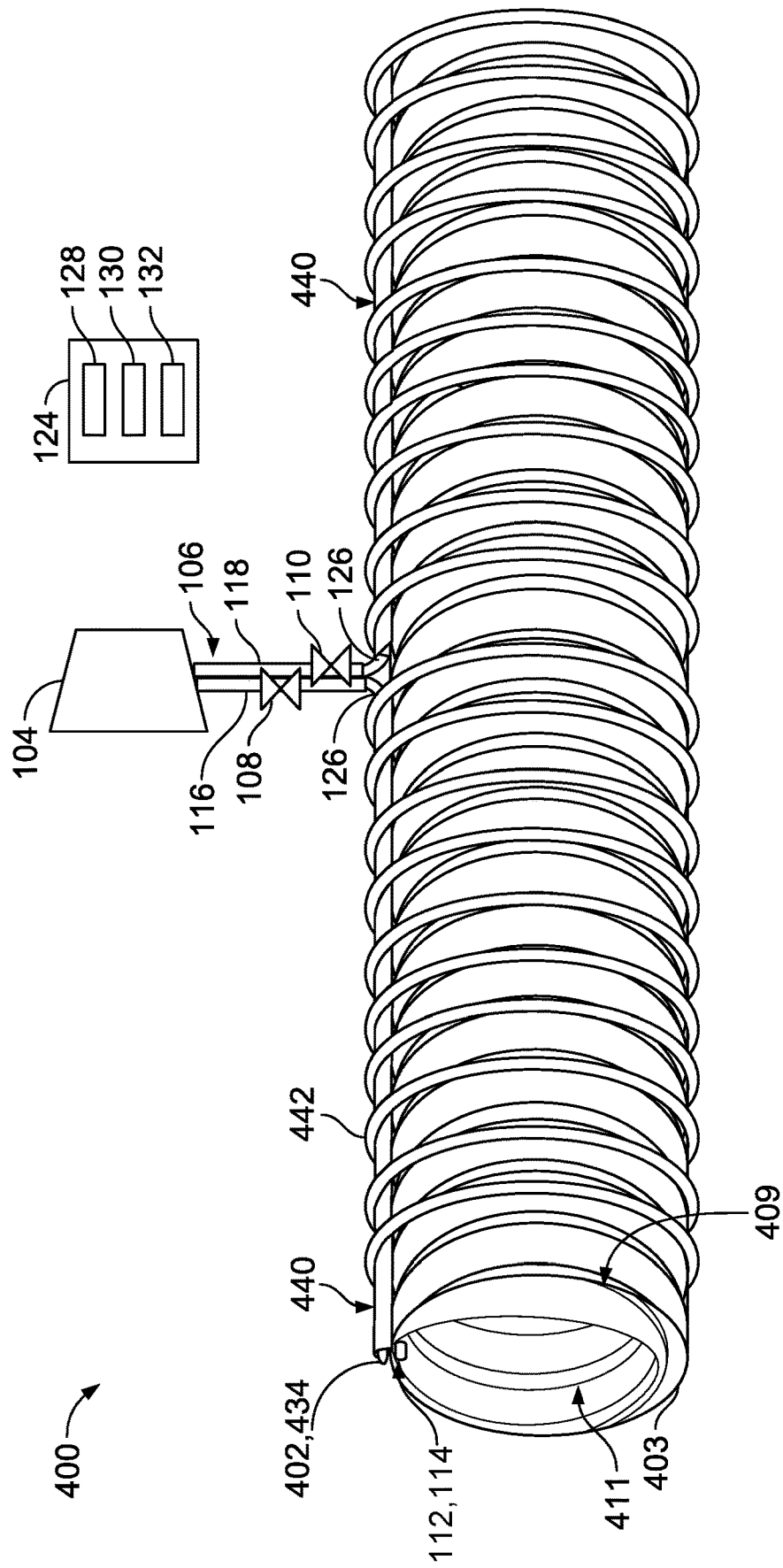
FIG. 13 is a perspective view of a flow management system including a linear expandable device that is installed to an exterior surface of a conduit.

While the flow management system 100 has been described and illustrated as including an expandable device 102 that is installed along the inner surface 109 of the conduit 103, in some embodiments, a flow management system may include an expandable device that is installed to an exterior surface of a flexible conduit. FIG. 13 illustrates such a flow management system 400, which includes an expandable device 402 that is installed to an exterior surface 409 of a flexible conduit 403. The conduit 403 is a flexible pipe segment (for example, a flexible transfer hose) formed of a plastic tubular shell that is reinforced with a spiral-shaped metal frame. The conduit 403 may be a segment of an onshore production pipeline or a segment of a subsea production pipeline carrying a flow of fluid 407 that includes one or both of oil and gas.

Figure 14:
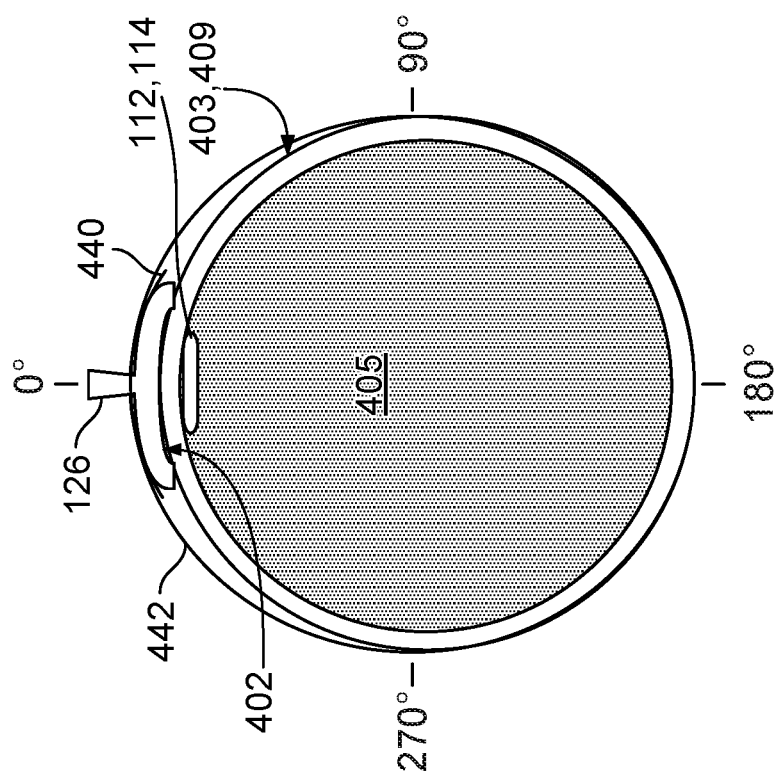
FIG. 14 is a cross-sectional view of the conduit of FIG. 13, obstructed with a flow blockage and equipped with the expandable device of FIG. 13 in a collapsed configuration.

Referring to FIGS. 13 and 14, the flow management system 400 also includes multiple rigid straps 442 (for example, hoops or braces) that securely hold the expandable device 402 in place against the conduit 403 and an elongate cover 440 that ensures uniform expansion of the expandable device 402 and protects the expandable device 402 from damage due to pressure exerted by the straps 442. The flow management system 400 is otherwise substantially similar in construction and function to the flow management system 100 and accordingly includes the fluidic actuator 104, the actuation line 106, the valves 108, 110, optionally the sensors 112, 114, and the control module 124.

In some examples, the expandable device 402 may be preinstalled to the conduit 403 at an axial location along the conduit 403 that is predicted to be vulnerable to blockage by multiphase flow assurance hydraulic analyses. In other examples, the expandable device 402 may be retrofitted to the conduit 403 before a blockage 405 has developed in the conduit 403, while the conduit 403 is of a relatively light weight and easy to lift. In yet still other examples, the expandable device 403 may be retrofitted to the conduit 403 after a blockage 405 has developed in the conduit 403 using heavier-duty equipment.

For a retrofit installation of the expandable device 402 to the conduit 403, the conduit 403 is accessed and lifted from the surface (for example, the seabed or the ground) with lifting equipment. The expandable device 402 is positioned against the conduit 403, and the straps 442 are sequentially applied and tightened around the expandable device 402 and the conduit 403 along a length of the expandable device 402. Such installation may be automated by rolling the expandable device 402 and the straps 442 off of a spool and onto the conduit 403. Advantageously, external placement of the expandable device 402 does not interfere with pipeline maintenance when performing scraping or utilizing well-work wireline tools.

Figure 15:
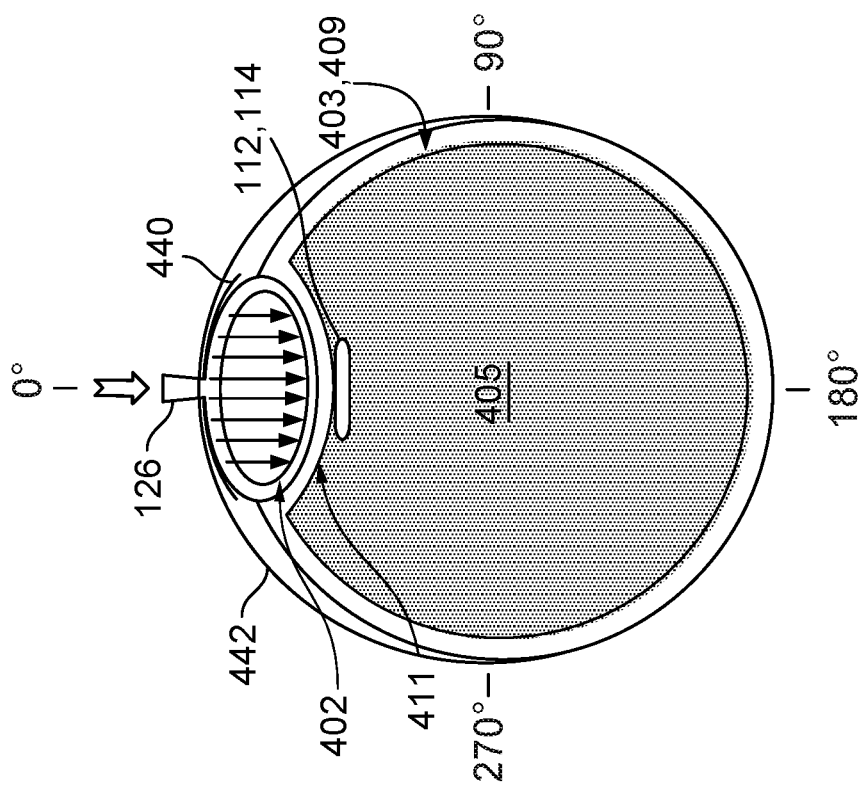
FIG. 15 is a cross-sectional view of the conduit of FIG. 13, obstructed with the flow blockage and equipped with the expandable device of FIG. 13 in an expanded configuration.

Since the expandable device 402 is installed to the exterior surface 409 and accordingly not exposed to a corrosive interior environment of the conduit 403, the expandable device 402 is provided as an inflatable membrane without any protective plates and may be made of one or more compliant materials that do not necessarily exhibit erosion and corrosion resistance, such as composite materials. The expandable device 402 is otherwise substantially similar in construction and function to the expandable device 102 and accordingly includes two portions 434 that extend in opposite directions from a single access point. Because the conduit 403 is flexible, radial forces exerted by the expandable device 402 during inflation deforms the conduit 403 (for example, pushes the conduit 403 radially inward) to cause the conduit 403 to compact a blockage 405 within the conduit 403 and create a channel 411, as shown in FIG. 15. In this manner, the expandable device 402 does not contact with the blockage 405 directly and thus indirectly compacts the blockage 405.

The straps 442 are distributed along an entire length of the expandable device 402 and the conduit 403 and may be made of one or more materials, such as polymeric materials. In the example of FIG. 13, each strap 442 has a width that falls in a range of about 1 centimeter (cm) to about 5 cm and a thickness that falls in a range of about 0.05 cm to about 0.25 cm. Installation of several straps 442 ensures that actuation energy delivered by the fluidic actuator 104 is completely transferred to the conduit 403 along an entire length of the expandable device 402. Furthermore, using multiple adjustable straps 442 that are distributed along the length of the expandable device 402 allows for installation against a conduit of variable diameter. In contrast, utilizing a single, long strap (for example, a tubular sleeve) may be less effective at ensuring complete transfer of actuation energy in cases where a conduit has a variable diameter.

In some embodiments, the flow management system 400 may alternatively or additionally include rigid elongate straps oriented parallel to a central axis of the conduit 403. Such elongate straps may be disposed between the expandable device 402 and the multiple straps 442 and between the conduit 403 and the multiple straps 442 to further secure the expandable device 402 and ensure completion transfer of the actuation energy to the conduit 403. Such elongate straps may be distributed about a circumference of the conduit 403 in a manner that provides full coverage of the exterior surface 409 of the conduit 403 or in a manner that defines gaps between the elongate straps.

Figure 16:
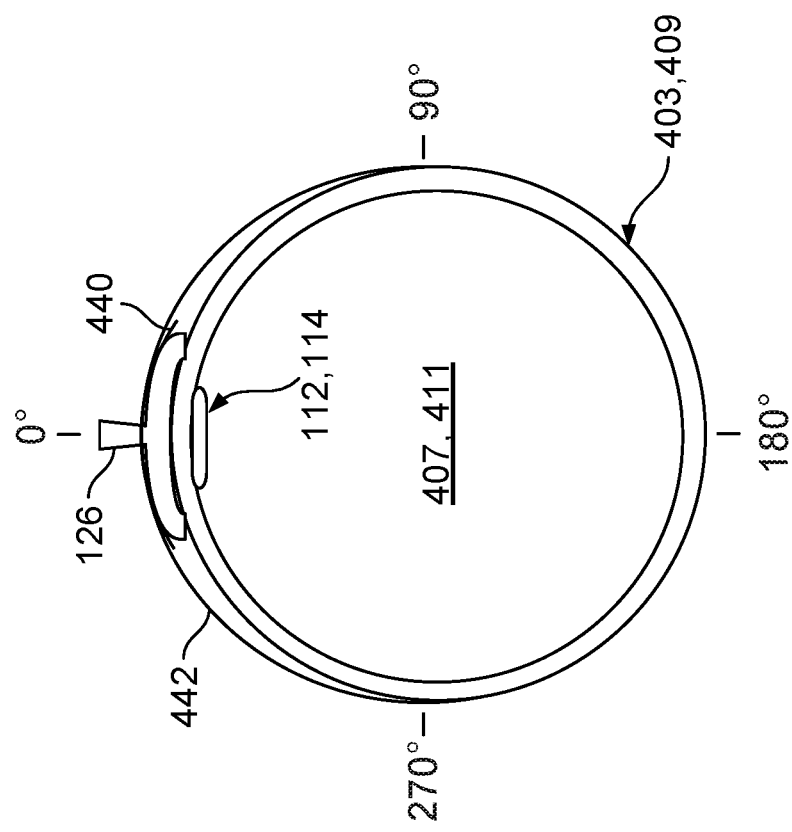
FIG. 16 is a cross-sectional view of the conduit of FIG. 13, partially obstructed with the flow blockage and equipped with the expandable device of FIG. 13 in the collapsed configuration.
Figure 17:
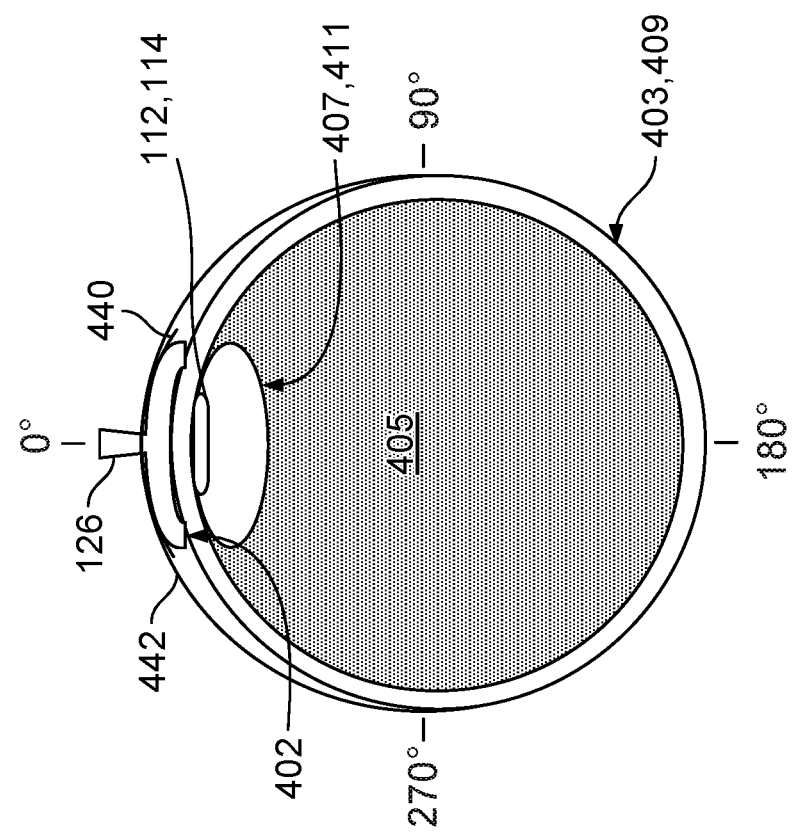
FIG. 17 is a cross-sectional view of the conduit of FIG. 13 in a state fully open to fluid flow and equipped with the expandable device of FIG. 13 in the collapsed configuration.

Referring to FIG. 16, the control module 124 can further control the fluidic actuator 104 to subsequently withdraw actuation fluid from the expandable device 402 to deflate the expandable device to the collapsed configuration, thereby allowing the conduit 403 to recoil radially outward. Deformation of the conduit 403 to its initial shape exposes the channel 411 to open the conduit 403 to flow of the fluid 407 and accordingly results in depressurization of the fluid 407. With flow of the fluid 407 reestablished in the conduit 403, additional blockage remediation efforts can be carried out at the conduit 403. Referring to FIG. 17, flow of the fluid 107 gradually washes out the blockage 405 and enlarges the channel 411 until the conduit 403 has been substantially cleared of the blockage 405 to permit free, unobstructed flow of the fluid 407.

Figure 18:
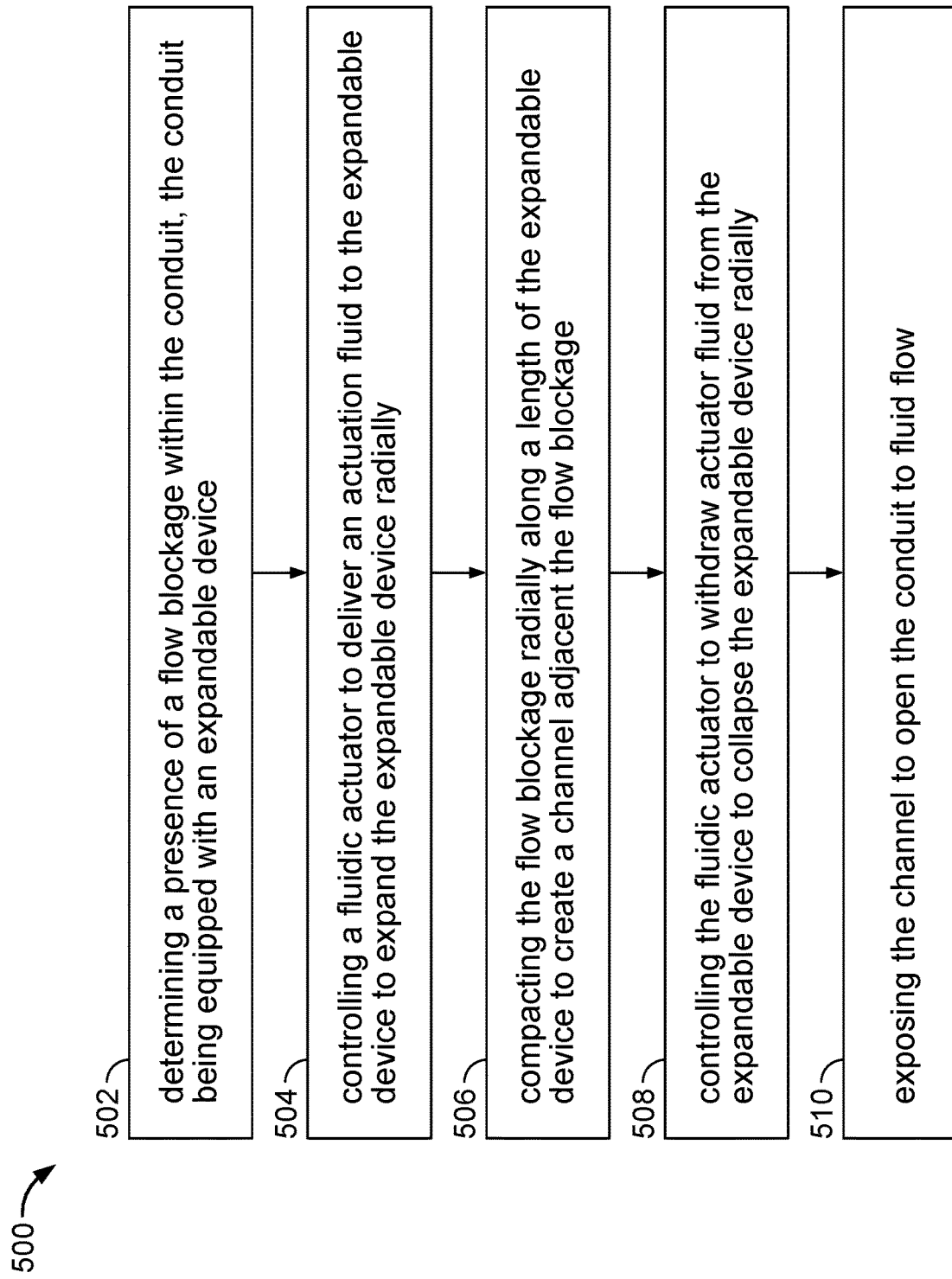
FIG. 18 is a flow chart illustrating an example method of managing a fluid flow within a conduit using any of the flow management systems of FIG. 1, 11, 12, or 13.

FIG. 18 is a flow chart illustrating an example method 500 of managing a fluid flow within a conduit (for example, the conduit 103, 203, 403). In some embodiments, the method 500 includes a step 502 for determining a presence of a flow blockage (for example, the blockage 105, 405) within the conduit, the conduit being equipped with an expandable device (for example, the expandable device 102, 202, 302, 402). In some embodiments, the method 500 further includes a step 504 for controlling a fluidic actuator (for example, the fluidic actuator 106) to deliver an actuation fluid to the expandable device to expand the expandable device radially. In some embodiments, the method 500 further includes a step 506 for compacting the flow blockage radially along a length of the expandable device to create a channel (for example, the channel 111, 411) adjacent the flow blockage. In some embodiments, the method 500 further includes a step 508 for controlling the fluidic actuator to withdraw actuation fluid from the expandable device to collapse the expandable device radially. In some embodiments, the method 500 further includes a step 510 for exposing the channel to open the conduit to fluid flow.

While the example scenarios mentioned above have been described and illustrated with respect to installation of a single expandable device 102, 202, 302, 402 along a conduit, in some implementations, multiple expandable devices 102, 202, 302, 402 may be installed to a conduit as necessary to mitigate clogging of the conduit.

While the actuation line 106 has been described and illustrated as a dual-channel actuation line that extends along an expandable device 102, 402 in two opposite directions from a single, central access point, in some embodiments, a flow management system that is otherwise substantially similar in construction and function to any of the flow management systems 102, 202, 302, 402 may alternatively include a single-lumen, continuous expandable device and a single-channel actuation line disposed near one end of such an expandable device. Accordingly, such an actuation line extends in one direction from a single access point located near the end of the expandable device.

While the pressure sensors 114 have been described and illustrated as located adjacent the expandable devices 102, 402, in some embodiments, a flow management system that is otherwise substantially similar in construction and function to any of the flow management systems 102, 202, 302, 402 may include a pressure sensor that is alternatively incorporated within the control module 124.

While the sensors 112, 114 have been described and illustrated as located at one end of the expandable device 102, 402, in some embodiments, sensors 112, 114 of a flow management system that is otherwise substantially similar in construction and function to any of the flow management systems 102, 202, 302, 402 may be positioned away from an end of an expandable device, such as near a central access point or at another location along a length of the expandable device.

While the expandable devices 102, 202, 302, 402 have been described and illustrated as part of flow management systems 100, 200, 300, 400, in some embodiments, an expandable device that is generally similar in configuration and function to any of the expandable devices 102, 202, 302, 402 may be deployed in other contexts that are unrelated to petroleum applications, such as biomedical applications (for example, inside of a blood vessel to remove a clog).

Other embodiments are also within the scope of the following claims.

What is claimed is:

1. A method of managing a fluid flow within a conduit, the method comprising:
   determining a presence of a flow blockage within the conduit, the conduit being equipped with an expandable device;
   controlling a fluidic actuator to deliver an actuation fluid to the expandable device to expand the expandable device radially;
   compacting the flow blockage radially along a length of the expandable device to create a channel adjacent the flow blockage;
   controlling the fluidic actuator to withdraw actuation fluid from the expandable device to collapse the expandable device radially; and
   exposing the channel to open the conduit to fluid flow.

2. The method of claim 1, wherein the expandable device comprises an inflatable membrane, and the method further comprises:
   delivering actuation fluid to the inflatable membrane to inflate the inflatable membrane; and
   withdrawing actuation fluid from the inflatable membrane to deflate the inflatable membrane.

3. The method of claim 2, wherein the expandable device further comprises a plurality of protective plates that surrounds and is attached to the inflatable membrane.

4. The method of claim 3, wherein the plurality of protective plates is configured to protect the inflatable membrane from erosion.

5. The method of claim 1, further comprising aligning the expandable device with an elongate axis of the conduit.

6. The method of claim 1, wherein compacting the flow blockage comprises providing direct contact between the expandable device and the flow blockage.

7. The method of claim 1, wherein compacting the flow blockage comprises deforming the conduit radially inward.

8. The method of claim 1, further comprising pneumatically actuating the expandable device.

9. The method of claim 1, further comprising hydraulically actuating the expandable device.

10. The method of claim 1, further comprising flowing the actuation fluid through an actuation line that extends between the fluidic actuator and the expandable device.

11. The method of claim 10, further comprising controlling a valve that manages flow of the actuation fluid through the actuation line.

12. The method of claim 10, further comprising delivering the actuation fluid to opposite sides of the expandable device.

13. The method of claim 1, further comprising detecting a temperature and a pressure within the conduit respectively at a temperature sensor and at a pressure sensor disposed within the conduit.

14. The method of claim 1, further comprising determining a flow rate of fluid flowing through the conduit at a flow rate sensor.

15. The method of claim 14, further comprising controlling the fluidic actuator based on data acquired by the flow rate sensor.

16. The method of claim 1, further comprising securing the expandable device to the conduit with a plurality of straps.

17. The method of claim 16, further comprising adjusting each strap of the plurality of straps based on a local diameter of the conduit.

18. The method of claim 16, further comprising distributing the plurality of straps along an entire length of the expandable device.

19. The method of claim 16, further comprising installing a protective cover along an outer side of the expandable device.

20. The method of claim 1, further comprising installing the expandable device to an exterior surface of the conduit.

* * * * *